United States Patent
Righi et al.

(10) Patent No.: US 8,963,741 B1
(45) Date of Patent: Feb. 24, 2015

(54) METHODS AND SYSTEMS FOR DYNAMIC ALERTING DURING MISSIONS

(75) Inventors: Luigi P. Righi, Laguna Hills, CA (US); Mark A. Talbot, Huntington Beach, CA (US); Gregory M. Wellbrook, Long Beach, CA (US); Timothy S. Wickham, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 1029 days.

(21) Appl. No.: 12/939,231

(22) Filed: Nov. 4, 2010

(51) Int. Cl.
*G08B 21/00* (2006.01)

(52) U.S. Cl.
USPC ............ 340/945; 340/963; 455/345; 455/431; 701/3

(58) Field of Classification Search
USPC .......... 340/540, 945, 963, 964; 701/3, 30, 35, 701/36; 455/344, 345, 431, 445
See application file for complete search history.

(56) References Cited

U.S. PATENT DOCUMENTS

| | | | | |
|---|---|---|---|---|
| 4,943,919 A * | 7/1990 | Aslin et al. | | 701/3 |
| 6,043,757 A * | 3/2000 | Patrick | | 340/963 |
| 6,115,656 A * | 9/2000 | Sudolsky | | 701/33.4 |
| 7,356,336 B2 | 4/2008 | Perez et al. | | |
| 7,599,305 B2 | 10/2009 | Bui | | |
| 7,668,632 B2 * | 2/2010 | Vian et al. | | 701/29.3 |
| 7,908,052 B2 * | 3/2011 | Howlett et al. | | 701/32.8 |
| 2004/0176887 A1* | 9/2004 | Kent et al. | | 701/30 |
| 2010/0076630 A1* | 3/2010 | Vian et al. | | 701/14 |
| 2010/0152924 A1* | 6/2010 | Pandit et al. | | 701/3 |

* cited by examiner

*Primary Examiner* — Hung T. Nguyen
(74) *Attorney, Agent, or Firm* — Armstrong Teasdale LLP (57) ABSTRACT

A method for alerting a user of a sequence of events that has occurred, based on data contained within messages occurring on one or more communications buses is described. The method includes entering, via a user interface, data defining a sequence of events for which an alert is desired, monitoring, with a unit coupled to the user interface, the messages occurring on the one or more communications buses for data indicative of an occurrence of the defined sequence of events, and providing an indication to the user that the sequence of events has occurred.

19 Claims, 5 Drawing Sheets

METHODS AND SYSTEMS FOR DYNAMIC ALERTING DURING MISSIONS

BACKGROUND

The field of the disclosure relates generally to alerting pilots and others that a sequence of events has occurred, and more specifically, to methods and systems for dynamic alerting during missions.

Modern aircraft are configured with a multitude of systems. Such systems include, navigation, fuel monitoring, altitude sensors, communications, radar, autopilot, and in the case of military aircraft, various weapons and defense systems to name a very few. Such systems are generally made up of one or more components that operate together as a system and are typically programmed to provide the flight crew with one or more displays that provide status, and allow for flight crew input. Components of such modern aircraft also include a host of indicators such as a door open indicator, a light off/on indicator and indicators for a host of other functions, such as wheels up/down. In summary, the number of systems, components, displays and indicators provided to a flight crew is extensive.

More specifically, one or more aircraft components generally are monitored and/or controlled by a single component of such a system. Components of such systems are often referred to as "line-replaceable-units" (LRUs). One type of LRU is a highly complex module often incorporating several processors for controlling and/or monitoring one or more components or subassemblies of an aircraft. Other LRUs are simple, such a mechanical device that outputs a signal based on a position of an engine nozzle. Certain LRUs may be provided to monitor and/or control one or more external devices such as an actuator, valve, motor, etc., associated with a particular component or assembly of the aircraft. An LRU typically also generates output signals which can be monitored to determine if the LRU and/or the component with which it is associated is not operating properly.

BRIEF DESCRIPTION

In one aspect, a method for alerting a user of a sequence of events that has occurred, based on data contained within messages occurring on one or more communications buses is provided. The method includes entering, via a user interface, data defining a sequence of events for which an alert is desired, monitoring, with a unit coupled to the user interface, the messages occurring on the one or more communications buses for data indicative of an occurrence of the defined sequence of events, and providing an indication to the user that the sequence of events has occurred.

In another aspect, a monitoring unit for detecting parameter conditions on one or more disparate data buses is provided. The monitoring unit includes a user interface for user selection of parameter conditions, the parameter conditions including a pattern of data signals associated with the messages occurring on the one or more disparate buses, a communications interface for communicatively coupling the unit to the one or more disparate buses, a processing device programmed to parse a plurality of messages occurring on the one or more disparate buses for one or more data that correspond to a detection the selected parameter conditions, and an output device responsive to a detection the selected parameter conditions by the processing device.

In still another aspect, a method for monitoring one or more communications buses for data within messages that describes a sequence of events is provided. The method includes entering, into a user interface, a combination of parameters to be monitored, the parameters occurring as data within one or more of the messages that occurs, monitoring the one or more messages to determine when the entered parameters occur as data within the one or more of the messages that occur on the one or more communications buses, and providing an indication that the entered parameters have occurred.

The features, functions, and advantages that have been discussed can be achieved independently in various embodiments or may be combined in yet other embodiments further details of which can be seen with reference to the following description and drawings.

DETAILED DESCRIPTION

Many of the line replaceable units (LRUs) in a modern aircraft communicate data to one another over one or more communications buses. A suite of LRUs and their supporting components may be referred to as a system of systems. As indicated, a system of systems can contain multiple communications buses and the communications between the various components (LRUs) over such buses may include thousands of parameters across the various messages that the LRUs provide to one another.

Figure 1:
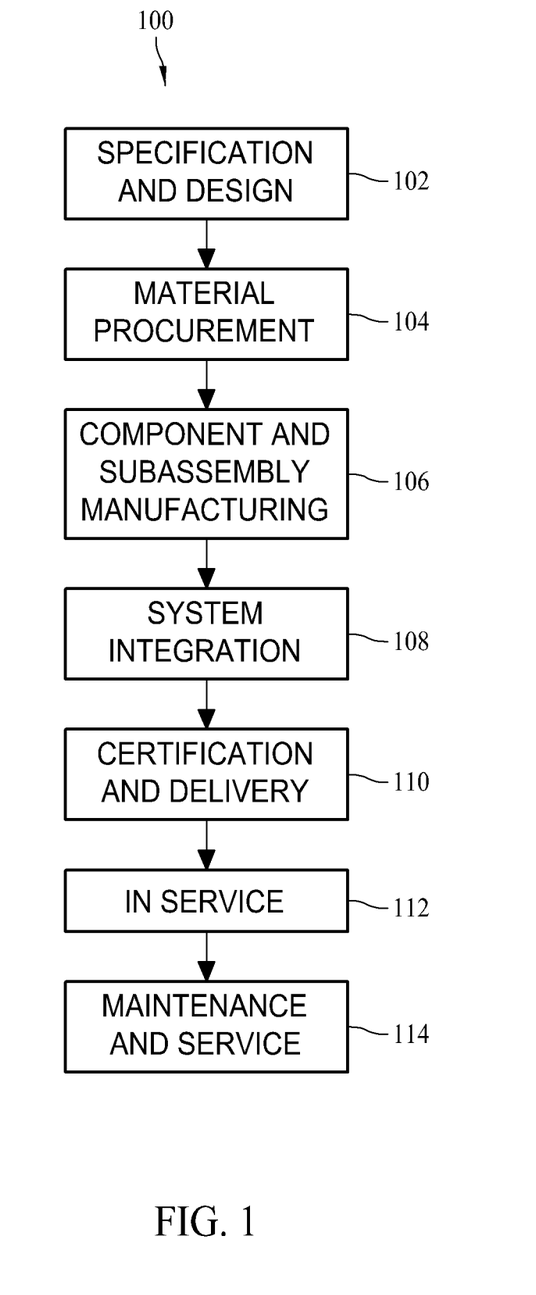
FIG. 1 is a flow diagram of an aircraft production and service methodology.
Figure 2:
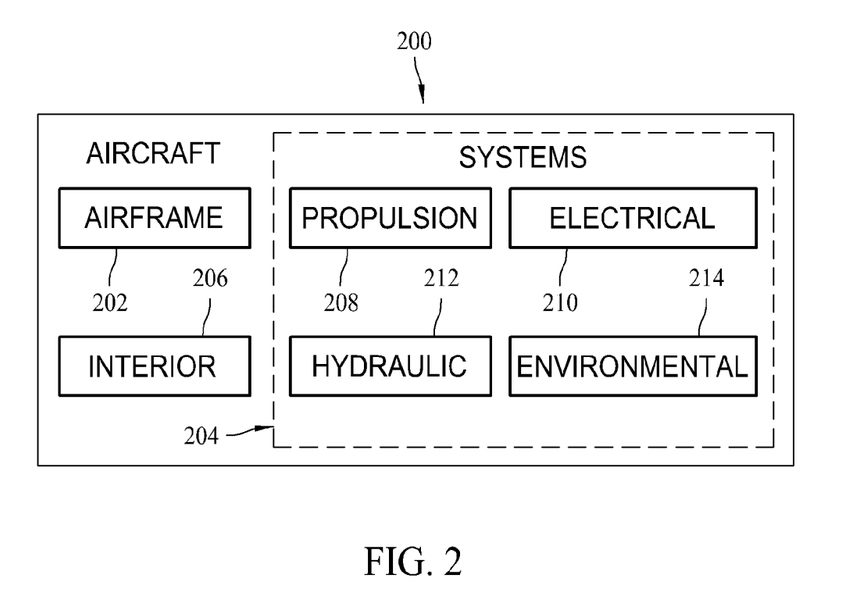
FIG. 2 is a block diagram of an aircraft.

By way of background, and referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place including the integration of many LRUs as described herein. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on) which from time to time includes replacement of faulty LRUs.

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on. Any one or multiple of these entities may be responsible for repair and/or replacement of LRUs within the platform.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example, and many of these systems are dedicated to a particular function, such as RADAR, and include one or more LRUs that are dedicated to performing the defined functions of the system, including communication of relevant data to other systems resident on a communications bus. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
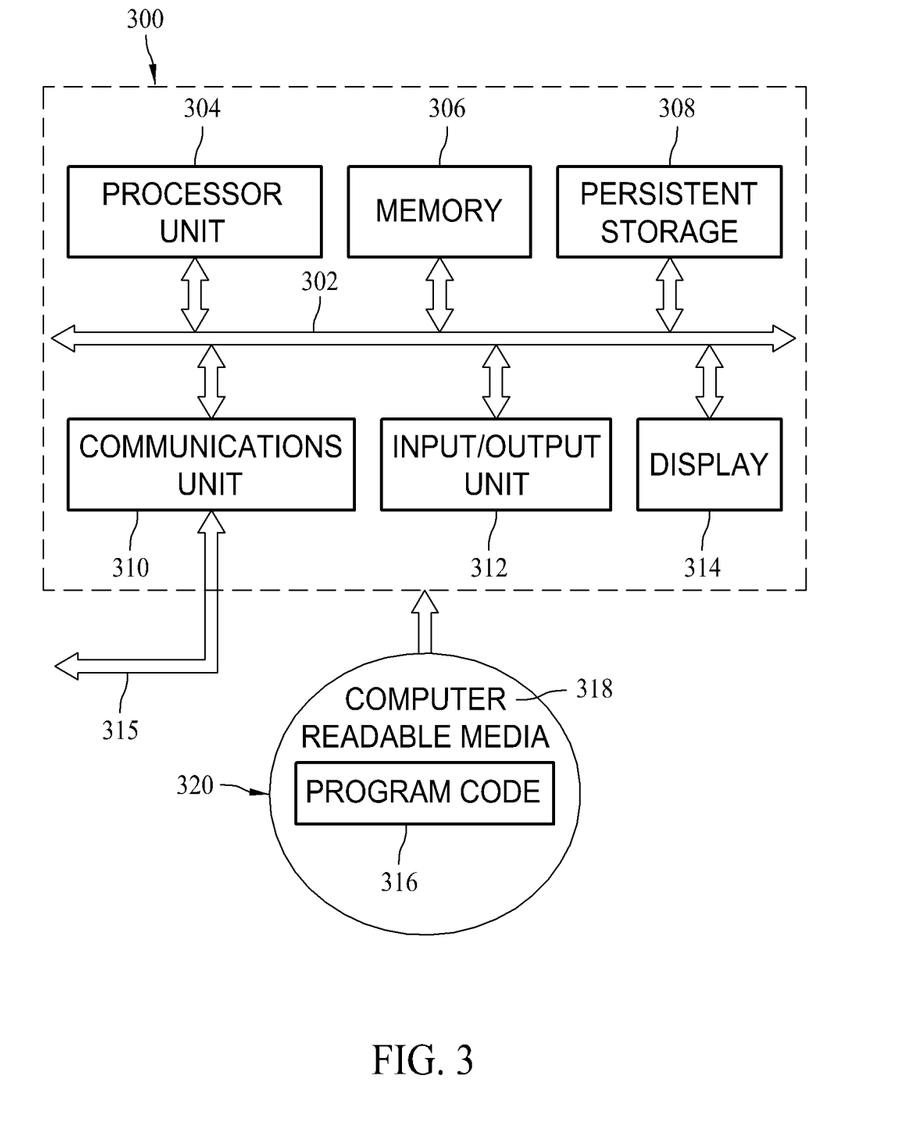
FIG. 3 is a diagram of a data processing system.

Turning now to FIG. 3, a diagram of a data processing system is depicted in accordance with an illustrative embodiment. The data processing system of FIG. 3 is but one example of a data processing system that might be deployed within an LRU. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices via an interface to external systems. In the context of the present disclosure, communications unit 310 is an interface to one or more communications buses 315 on an aircraft as described elsewhere herein. Communications unit 310 may provide communications via communications buses 315 through the use of either or both physical and wireless communication links.

Input/output unit 312 allows for input and output of data with other devices that may be connected to data processing system 300. For example, without limitation, input/output unit 312 may provide a connection for user input through a user interface, including, but not limited to, a touch display, a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over communications bus 315 to persistent storage 308 from another device or data processing system for use within data processing system 300. For instance, program code stored in a computer readable storage medium may be downloaded to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

A bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

As mentioned above, the above described data processing system 300 is one example of a system operable for to provide the processing functions for a particular LRU. Now referring to FIG. 4, aircraft 200 includes a number of line-replaceable-units (LRUs) 400 passing data over a number of different avionics buses 402. As explained herein, each LRU 400 can include a module incorporating one or more processors for controlling and/or monitoring one or more components or subassemblies of aircraft 200. For simplicity, LRU 400 refers to any LRU shown in FIG. 4. References to specific LRUs in the following paragraphs utilize different reference numerals.

Figure 4:
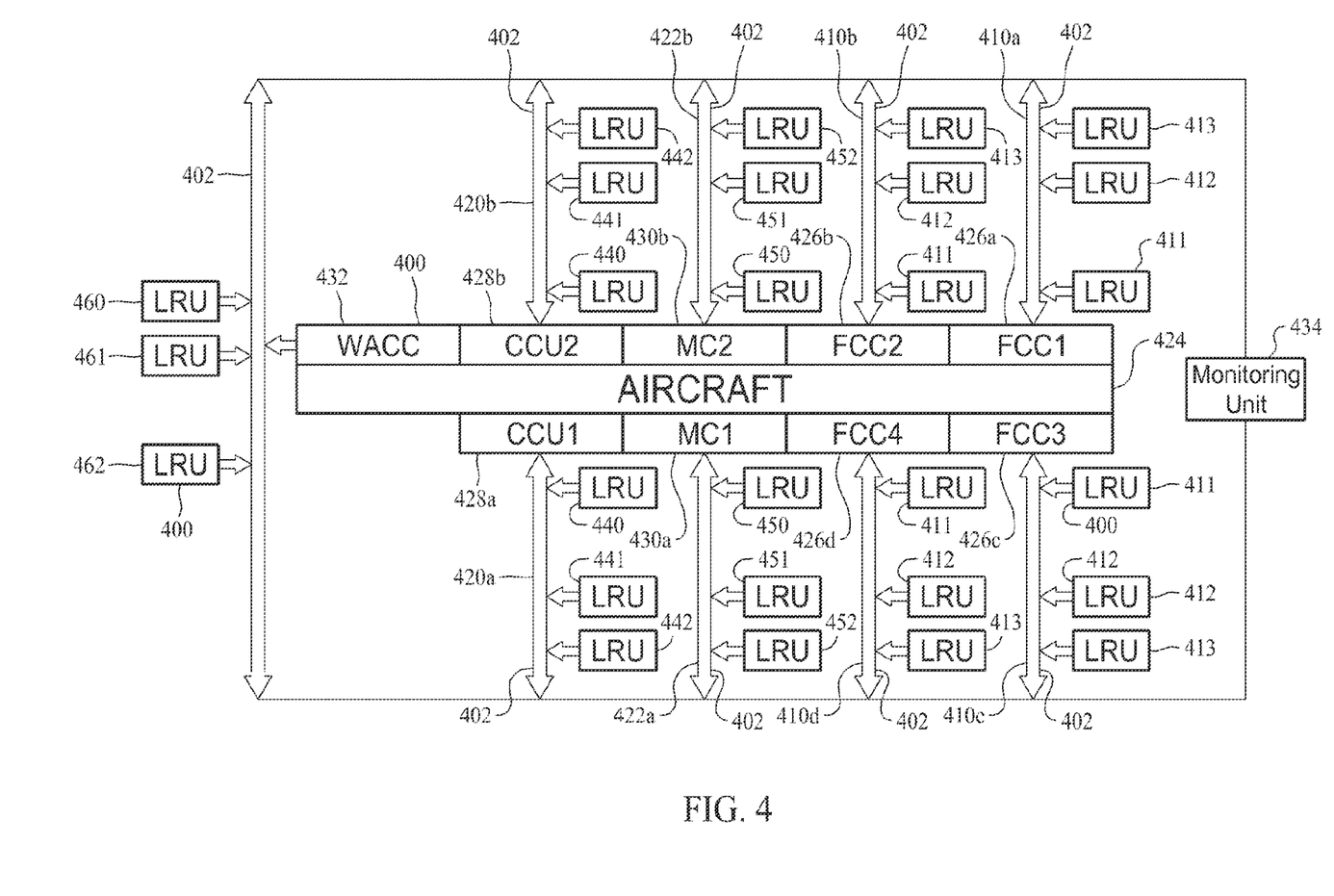
FIG. 4 is a diagram illustrating an aircraft configuration of multiple communications buses providing a communications capability for a multitude of line replaceable units.

In this regard, each LRU 400 of the aircraft can be provided to monitor and/or control one or more external devices such as an actuator, valve, motor, etc., associated with a particular component or assembly of the aircraft. In addition each LRU 400 typically also generates output signals, for example, in the form of messages output onto avionics buses 402, which can be monitored to determine if the LRU 400 and/or the component with which it is associated is not properly operating. These LRUs also receive messages from the other LRUs. Specifically, each of the messages contains one or more bits of data that can be reviewed for the purpose of providing information as to the operation of the avionics and/or components coupled thereto.

The aircraft 200 can include any of a number of different LRUs 400 capable of communicating across one or more avionics buses 402. Each avionics bus, and thus the respective LRUs communicating thereon, can be configured to communicate in accordance with any of a number of different standards or protocols. In one typical embodiment, for example, a plurality of avionics buses can be configured in accordance with Mil-Std-1553, entitled: Military Standard Aircraft Internal Time Division Command/Response Multiplex Data Bus (with which its revisions and updates is incorporated by reference herein for all purposes). In such instances, as shown more particularly in FIG. 4, an example aircraft can include four flight control buses 410a-410d, two communication buses 420a, 420b, two mission buses 422a, 422b and a warning and caution system (WACS) bus 424. None, any, or all of the communications buses 402 can be Mil-std-1553, as other communications bus protocols are known. This document refers to the communications buses 402 as Mil-std-1553 buses for convenience only, and the disclosure should not be construed as limited to Mil-std-1553.

Each Mil-Std-1553 bus 410a-410d, 420a, 420b, 422a, 422b, 424 of the aircraft 200, in turn, can include a primary and a secondary channel for transmitting signals between the various LRUs 400 and bus controller of the respective bus. In this regard, each of the LRUs 400 associated with each Mil-Std-1553 bus is considered one or both of a bus controller and a remote terminal. A single avionics bus configured in accordance with Mil-Std-1553 may support up to thirty-one separate remote terminals. For example, as shown in FIG. 4, each flight control bus 410a-410d can have an associated flight control computer (FCC) 426a-426d and a number of LRUs 411, 412, 413. Each respective FCC, which is also considered an LRU, then, can control the LRUs associated with a respective flight control bus to thereby control the primary and secondary flight surfaces of the aircraft.

Also, for example, each communication bus 420a, 420b can have an associated communication control unit (CCU) 428a, 428b and a number of LRUs 440, 441, 442. The respective CCU's, which are also considered LRUs, can control the LRUs associated with the respective buses to control functions for the Integrated Radio Management System (IRMS), including radio, intercom and public address (PA) system control. Each mission bus 422a, 422b, for example, can have an associated mission computer (MC) 430a, 430b, often referred to as a core integrated processor (CIP), and considered an LRU. The MC's can control operation of a number of LRUs 450, 451, 452 associated with the respective mission buses to provide control, display and data processing for navigation system modes and sensor management navigation capability. The MC's can also provide four-dimensional (4D) guidance of the aircraft, thrust management and data for aircraft takeoff, landing, missed approach and engine-out conditions. Further, for example, the WACS bus 424 can include an LRU referred to as a warning and caution computer WACC 432 controlling operation of a number of LRUs 460, 461, 462 associated with the WACS bus. In addition, the WACC can convert aircraft status/failure signals for display on a warning annunciator panel (WAP). It is to be understood that the architecture of FIG. 4 is but one example aircraft architecture and that communications buses in addition or instead of Mil-Std-1553 may be utilized.

As explained more fully below, to monitor the avionics buses 402 to test one or more of the LRUs of the aircraft 200, the system of one embodiment includes an onboard reasoner (OBR) or monitoring unit 434 coupled to one or more of the avionics buses mentioned herein. The monitoring unit 434 is therefore capable of receiving data output from any or all of the LRUs associated with one or more avionics buses, and thereafter recording and/or transmitting at least a portion of the data to a user processor 436 for subsequent presentation, analysis or the like.

In contrast to conventional techniques for testing and monitoring LRUs 400 of an aircraft 12, the monitoring unit 434 is capable of monitoring the data output from all of the LRUs 400 associated with a greater plurality of avionics buses, such as all of the LRUs associated with the Mil-Std-1553 buses 402, 410*a*-410*d*, 420*a*, 420*b*, 422*a*, 422*b*, 424. Also in contrast to conventional techniques, if so desired, the monitoring unit 434 can be configured to identify events, such as faults, in the data output by the respective LRUs 400. The monitoring unit 434 can be further configured to identify a sequence of events identifiable based on the data output by the respective LRUs 400. Such sequences of events may also be time-based. By identifying such events, the monitoring unit 434 can selectively record and transmit data output from the LRUs 400, or filter out data output from the LRUs 400 that does not indicate an event of one or more LRUs 400. As such, the monitoring unit 434 can monitor and record data from LRUs 400 of the aircraft 200 without requiring an undesirable amount of memory resources, and as such, can transmit the recorded data without requiring an undesirable amount of time.

Figure 5:
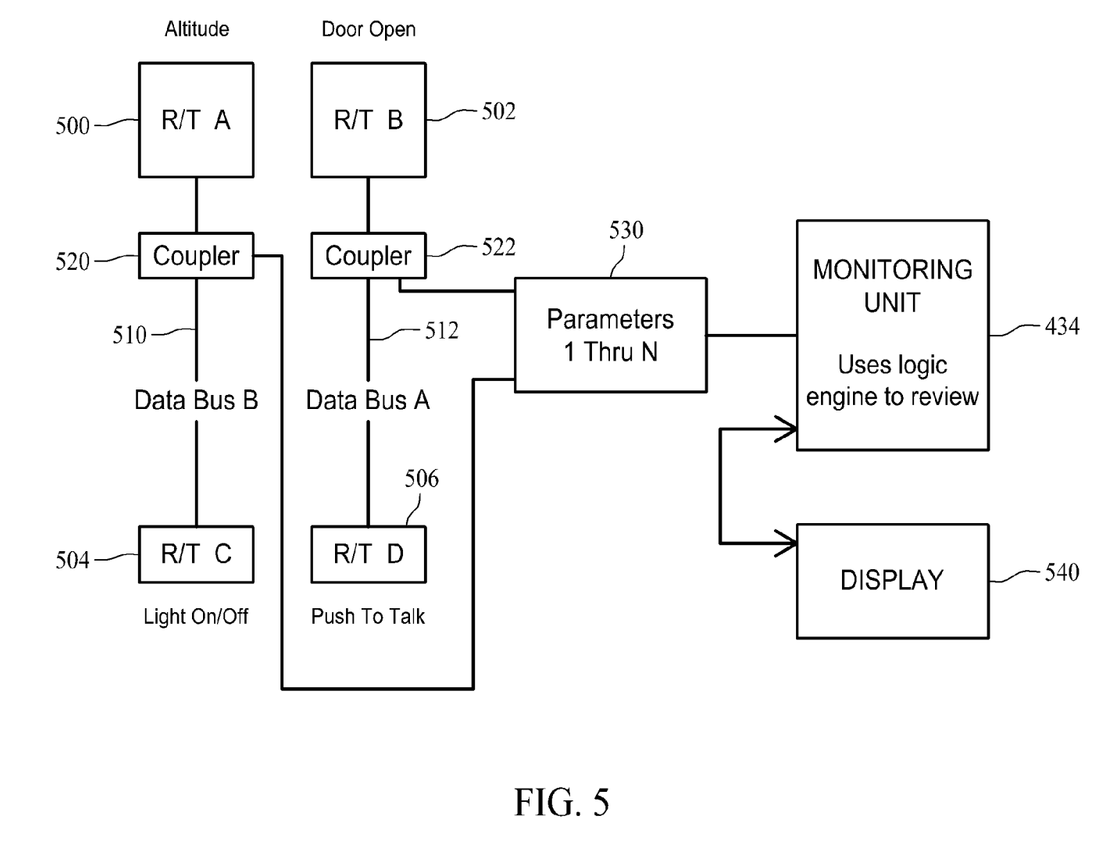
FIG. 5 is an illustrative example of various remote terminals providing data to a monitoring unit programmed to examine the data for the existence of a user programmed condition.

The monitoring unit 434 can be further programmed to inform a flight crew or other personnel dynamically as to a sequence of events. Examples include an altitude profile that has occurred or a combination of data occurring within the various messages transmitted across one or more of the data buses of the type described herein. This process is sometimes referred to dynamic alerting and a simple example is illustrated by FIG. 5. FIG. 5 illustrates communications between four remote terminals (which are generally LRUs 400) and the monitoring unit 434. The four remote terminals (R/Ts) 500, 502, 504, and 506 provide various data in the course of their operation. The R/Ts 500, 502, 504, and 506 may be located on a single or on multiple communications buses. In the illustrated embodiment, R/Ts 500 and 504 are on data bus B 510 and R/Ts 502 and 506 are on data bus A 512. To provide monitoring unit 434 with access to the data passed via data bus A 512 and data bus B 510, a coupler 520 and 522 is added to the respective bus 510 and 512. The monitoring unit 434 receives all the data on all the buses, including the data entering into and out of the remote terminals of data bus A 512 and data bus B 510. Operating together with monitoring unit 434, is a parameter entry module 530 that a pilot utilizes to enter a condition to be monitored. Parameter entry module 530 may be physically a part of display 540 or it may be a physically separate module. In one embodiment, display 540 is an electronic flight bag (EFB).

It should be noted that much of the software programs operating in various LRUs is dedicated to informing a flight crew of various conditions, via an indicator or a display. However, with the multitude of LRUs on modern aircraft, every possible scenario or sequence of events cannot be accounted for in the operational flight programs (OFPs) running in the individual LRUs. The described embodiments provide a mechanism for a pilot or other personnel to input a set of conditions for which they are looking. Such conditions may occur during normal flight, or may occur during maintenance operations, or even during flight testing.

FIG. 5 provides an illustrative example. Particularly, R/T 500 provides altitude data on data bus B 510, R/T 502 provides data indicating the open or closed states of a troop deployment door on data bus A 512. Similarly, R/T 504 provides data indicative of the status of a particular light on data bus B 510, while R/T 506 provides data indicating the state of a push-to-talk button on data bus A 512. In one scenario, the pilot may want to know when the push-to-talk button has been pushed when the deployment door is open and the altitude is at least 10,000 feet. The monitoring unit 434 is programmed to watch the data on data buses A and B (510 and 512) and provide an indication when such event occurs. Such an indication can be one or more of audio and visual.

Those skilled in the art will now understand that a user, such as a pilot, can enter any combination of parameters to be monitored simultaneously, for example, into an EFB and request notification when the parameters exhibit the desired combination of events. The monitoring unit 434 executes the entered command entered and notifies the pilot on the EFB display, such as display 540. The entry of the command, in one embodiment, is performed by the pilot during flight. The notifications to the pilot via the EFB may also be sent to facilities on the ground and/or to another aircraft. As such the described embodiments allows pilot to set an event alarm and have the aircraft notify him/her of any combination of events they choose relative to the aircraft or other aircraft, based on data that is already available on the communications buses associated with the aircraft.

The above example is mission based. Maintenance based inquiries may include a notification when a particular R/T has provided eight (or more) slow responses or when an R/T has "missed" responding to a message that should trigger a response message from such R/T.

The above described embodiments provide an on-the-fly configurable alert system that allows a user to configure the monitoring unit 434 to monitor the various communications buses of the platform for data contained within various messages that define a condition for which the user is watching. The embodiment therefore allows the thousands of parameters handled by on-board busses to be harnessed to provide alerts to an extremely large number of combinations of possible events. Specifically, the user sets an event alarm, such as the scenario described above, and the aircraft, through the monitoring unit 434, notify the user of any combination of events chosen relative to the aircraft or other aircraft.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for alerting a user of a sequence of events that has occurred, based on data contained within messages occurring on one or more communications buses, said method comprising:

receiving, via a display including a user interface, user selection of data defining a sequence of events for which an alert is desired;

monitoring, with a unit coupled to the user interface, the messages occurring on the one or more communications buses for data indicative of an occurrence of the defined sequence of events; and providing an indication to the user that the sequence of events has occurred.

2. The method according to claim 1 wherein monitoring the messages occurring on the one or more communications buses comprises monitoring messages transmitted between line replaceable units on an aircraft.

3. The method according to claim 1 wherein monitoring the messages occurring on the one or more communications buses comprises parsing the messages for data therein indicative of the sequence of events.

4. The method according to claim 1 wherein monitoring the messages occurring on the one or more communications buses comprises communicatively coupling the unit to the one or more communications buses.

5. The method according to claim 1 wherein monitoring the messages occurring on the one or more communications buses comprises monitoring communications buses incorporating a plurality of communications protocols.

6. The method according to claim 1 wherein the sequence of events is defined based on one or more of the time occurring between events and the order of events in the sequence.

7. The method according to claim 1 wherein providing an indication to the user comprises providing at least one of an audio and a visual indication to the user interface.

8. The method according to claim 1 wherein monitoring the messages occurring on the one or more communications buses for data indicative of an occurrence of the defined sequence of events comprises determining when a remote terminal on the one or more communications buses does not respond or is slow in responding to a message intended to trigger a response message from the remote terminal.

9. A monitoring unit for detecting parameter conditions on one or more disparate data buses, said monitoring unit comprising:
   a display including a user interface for receiving user selection of parameter conditions, the parameter conditions including a pattern of data signals associated with messages occurring on the one or more disparate buses;
   a communications interface for communicatively coupling said unit to the one or more disparate buses;
   a processing device programmed to parse a plurality of messages occurring on the one or more disparate buses for one or more data that correspond to a detection of the selected parameter conditions; and
   an output device responsive to a detection of the selected parameter conditions by said processing device.

10. A monitoring unit according to claim 9 wherein said communications interface is configured to interface with a plurality of communications protocols utilized by the one or more disparate data buses.

11. A monitoring unit according to claim 9 wherein said communications interface comprises an interface to one or more communications buses providing communication between line replaceable units within an aircraft.

12. A monitoring unit according to claim 9 wherein the user selection of parameter conditions comprises data on the communications buses that occurs in response to a sequence of events.

13. A monitoring unit according to claim 9 wherein said processing device is programmed to parse messages transmitted between line replaceable units deployed on an aircraft, the line replaceable units sharing a communications bus protocol.

14. A monitoring unit according to claim 9 wherein said display comprises an electronic flight bag.

15. A monitoring unit according to claim 9 wherein the one or more disparate data buses comprise communications buses on an aircraft upon which individual line replaceable units communicate.

16. A method for monitoring one or more communications buses for data within messages that describes a sequence of events, said method comprising:
   receiving, via a display including a user interface, user selection of a combination of parameters to be monitored, the parameters occurring as data within one or more of the messages that occurs;
   monitoring the one or more messages to determine when the entered parameters occur as data within the one or more of the messages that occur on the one or more communications buses; and
   providing an indication that the entered parameters have occurred.

17. The method according to claim 16 wherein the combination of parameters to be monitored includes a lack of one or messages occurring on the one or more communications buses when conditions indicate that such one or more messages should have occurred.

18. The method according to claim 16 wherein receiving, via a display including a user interface, user selection of a combination of parameters to be monitored comprises receiving the parameters in an electronic flight bag communicatively coupled to a monitoring unit coupled to the one or more communications buses.

19. The method according to claim 16 wherein the sequence of events is defined based on one or more of the time occurring between events and the order of events in the sequence.

* * * * *